US006345818B1

(12) United States Patent
Stephan et al.

(10) Patent No.: US 6,345,818 B1
(45) Date of Patent: Feb. 12, 2002

(54) ROBOTIC MANIPULATOR HAVING A GRIPPING TOOL ASSEMBLY

(75) Inventors: Peter Heinrich Stephan, Lathrup Village; Josh Person, Pontiac; Brad Wood, Lake Orion, all of MI (US)

(73) Assignee: Fanuc Robotics North America Inc., Rochester, NY (US)

( * ) Notice: Subject to any disclaimer, the term of this patent is extended or adjusted under 35 U.S.C. 154(b) by 0 days.

(21) Appl. No.: 09/427,473

(22) Filed: Oct. 26, 1999

Related U.S. Application Data

(60) Provisional application No. 60/105,586, filed on Oct. 26, 1998.

(51) Int. Cl.$^7$ ................................................. B65H 3/08
(52) U.S. Cl. ........................... 271/91; 271/98; 271/106; 294/65
(58) Field of Search ............................. 271/91, 92, 98, 271/106; 414/797; 294/64.1, 65

(56) References Cited

U.S. PATENT DOCUMENTS

| 2,217,983 A | | 10/1940 | Hopkins | |
|---|---|---|---|---|
| 3,031,906 A | | 5/1962 | Holman | |
| 3,063,578 A | | 11/1962 | Millar | |
| 3,199,863 A | | 8/1965 | Müller | |
| 3,673,759 A | * | 7/1972 | Ayres et al. | |
| 3,724,687 A | | 4/1973 | Marschke et al. | |
| 3,826,485 A | | 7/1974 | Shindo | 271/106 |
| 3,879,031 A | | 4/1975 | Melehan | 271/11 |
| 3,901,392 A | | 8/1975 | Streckert | |
| 4,081,085 A | | 3/1978 | Haenni | |
| 4,231,563 A | * | 11/1980 | Boucraut | 271/98 X |
| 4,382,593 A | * | 5/1983 | Beran et al. | 271/98 X |
| 4,451,028 A | * | 5/1984 | Holmes et al. | 271/98 X |
| 4,470,589 A | * | 9/1984 | Singer | 271/98 X |
| 4,806,071 A | | 2/1989 | Sartorio | |
| 5,048,811 A | * | 9/1991 | Hochbein | 271/106 X |
| 5,074,538 A | * | 12/1991 | Naumann | 271/98 X |
| 5,207,553 A | | 5/1993 | Konagai | 414/737 |
| 5,211,435 A | | 5/1993 | Nagai et al. | 294/64.1 |
| 5,352,086 A | | 10/1994 | Mank | 414/797 |
| 5,535,997 A | * | 7/1996 | Croyle et al. | 271/106 X |
| 5,609,377 A | | 3/1997 | Tanaka | 294/65 |

* cited by examiner

Primary Examiner—Janice L. Krizek
(74) Attorney, Agent, or Firm—Howard & Howard

(57) ABSTRACT

A robotic manipulator having a gripping tool assembly for separating a thin sheet of metal from a stack of metal sheets. The assembly comprises a frame mounted to a lift arm. A separating device is pivotally mounted to the frame for grasping and lifting a corner of the top metal sheet to create an initial separation of the sheet from the stack. A plurality of stationary suction lifters are secured to the frame for grasping and lifting the remaining portions of the top sheet. The gripping tool assembly is characterized by first and second air hoses or nozzles mounted to the frame with the first air nozzle positioned above the second air nozzle whereby the first air nozzle provides pressurized air toward the corner of the sheet to assist in the initial separation of the sheet and the second air nozzle provides pressurized air below the sheet after the initial separation of the sheet from the stack. The subject invention also includes a method comprising the steps of; affixing the stationary suction lifters and the separating device to the top sheet, actuating the separating device to lift the corner of the sheet to create the initial separation between the sheet and the stack, and the method is characterized by dispensing pressurized air toward the corner of the top sheet simultaneously with the actuating of the separating device and dispensing pressurized air below the top sheet after the initial separation of the sheet from the stack.

17 Claims, 4 Drawing Sheets

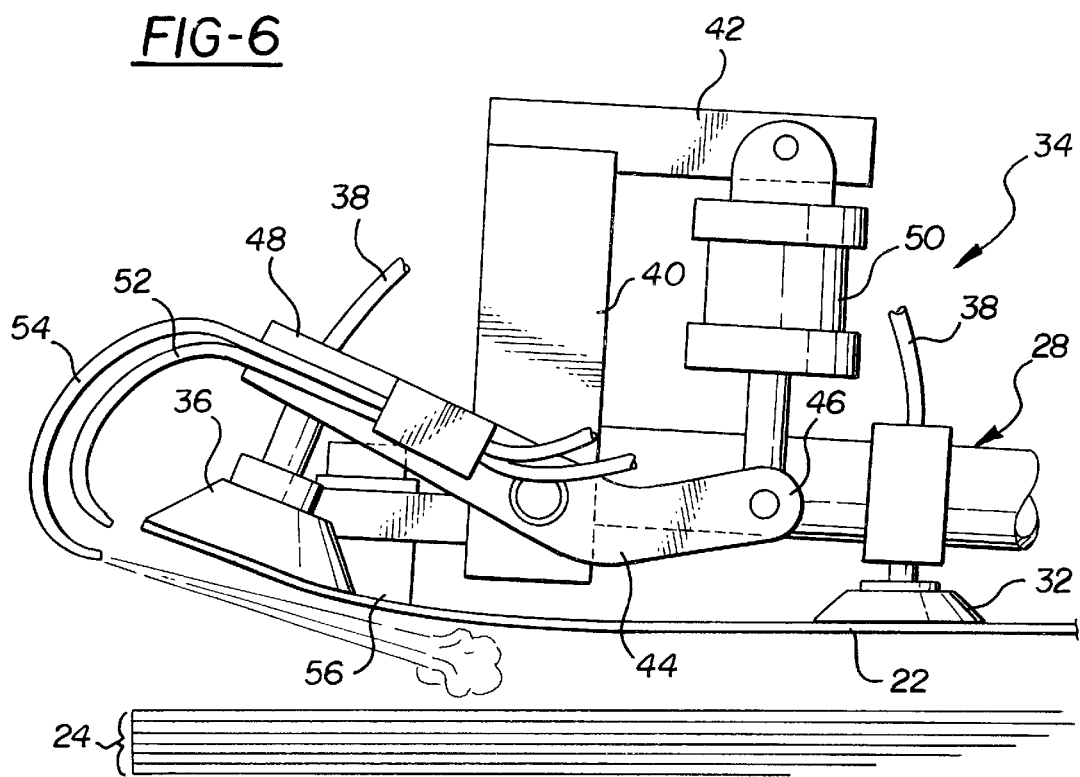

ROBOTIC MANIPULATOR HAVING A GRIPPING TOOL ASSEMBLY

RELATED APPLICATION

This patent application claims priority to and all the benefits of U.S. Provisional Patent Application Ser. No. 60/105,586 which was filed on Oct. 26, 1998 and is entitled "Robot Tool Assembly".

BACKGROUND OF THE INVENTION

1) Technical Field

The subject invention relates to a robotic manipulator for grasping, separating and transporting a single sheet of material from a stack of material to a drop-off zone.

2) Description of the Prior Art

Various machines and de-stackers have been contemplated by the prior art for grasping, separating and transporting a single sheet of material from a stack of material. The stacks of material may include thin sheets of metal, such as steel or aluminum, thin sheets of plastic, glass plates, corrugated paper, lumber, wall and roofing panels or other like workpieces. During the lifting and separating of the sheets, many of these articles have a tendency to stick together due to vacuum pressure. Hence, a user may have difficulty separating the sheets such that more that one sheet of material is transported at a time.

To add to the difficulty, the thin sheets of metal are typically surface treated with oil or grease. In addition, during the stacking of the sheets, the air between adjacent sheets is usually expelled by the weight of the metal sheets. Thus resulting in the formation of a continuous film of lubricating material between adjacent metal sheets which acts as a glue between the sheets. This problem is particularly prevalent in such industries as the automotive industry in which many products are manufactured from metal sheets in a relatively rapid succession. The individual sheets must be quickly unstacked and fed one at a time into production presses.

To overcome the difficulties associated with de-stacking these sheets, in particular thin metal sheets, the prior art has developed several different methods and apparatuses. One known method is to incorporate a plurality of suction cups in which some of the suction cups may be raised to bend the top sheet of metal and to then separate the top sheet from the stack of material. This separation may also be assisted by dispensing air near the separation point. Examples of these types of de-stacking apparatuses are disclosed in U.S. Pat. Nos. 3,826,485; 4,081,085; 5,207,553; and 5,609,377. These prior art solutions have been only moderately effective and fail to provide satisfactory, rapid and reliable separating and transporting of the single sheets of material.

SUMMARY OF THE INVENTION AND ADVANTAGES

A robotic manipulator having a gripping tool assembly for separating an uppermost sheet of material from a stack of material. The assembly comprises a lift arm and a frame fixedly mounted to the lift arm. At least one separating device is movably mounted to the frame for grasping and lifting a peripheral portion of the uppermost sheet of material to create an initial separation of the uppermost sheet of material from the stack of material. At least one stationary suction lifter is fixedly secured to the frame for grasping and lifting the remaining portions of the uppermost sheet of material after the initial separation of the uppermost sheet of material. The gripping tool assembly is characterized by first and second air hoses or nozzles mounted to the frame with the first air nozzle positioned above the second air nozzle whereby the first air nozzle provides pressurized air toward the periphery of the uppermost sheet of material to assist in the initial separation of the uppermost sheet of material and the second air nozzle provides pressurized air below the uppermost sheet of material after the initial separation of the uppermost sheet of material.

The subject invention also includes the method of separating the uppermost sheet of material from the stack of material comprising the steps of; affixing the stationary suction lifters to the uppermost sheet of material, affixing the separating device to the uppermost sheet of material, actuating the separating device to lift the peripheral portion of the uppermost sheet of material to create the initial separation between the uppermost sheet and the stack of material, and the method is characterized by dispensing pressurized air toward the periphery of the uppermost sheet of material simultaneously with the actuating of the separating device and dispensing pressurized air below the uppermost sheet of material after the initial separation of the uppermost sheet of material.

Accordingly, the subject invention includes a method and apparatus which effectively separates a single sheet of material from a stack of material by utilizing a pair of air nozzles working in conjunction with the separation device. As will be discussed in greater detail below, the subject invention also incorporates a number of other devices to ensure that only one sheet of material is separated and lifted from the stack of material.

BRIEF DESCRIPTION OF THE DRAWINGS

Other advantages of the present invention will be readily appreciated as the same becomes better understood by reference to the following detailed description when considered in connection with the accompanying drawings wherein:

FIG. 6 is a side view of the separating device lifting the top sheet off of the stack of material.

DETAILED DESCRIPTION OF THE PREFERRED EMBODIMENT

Figure 1:
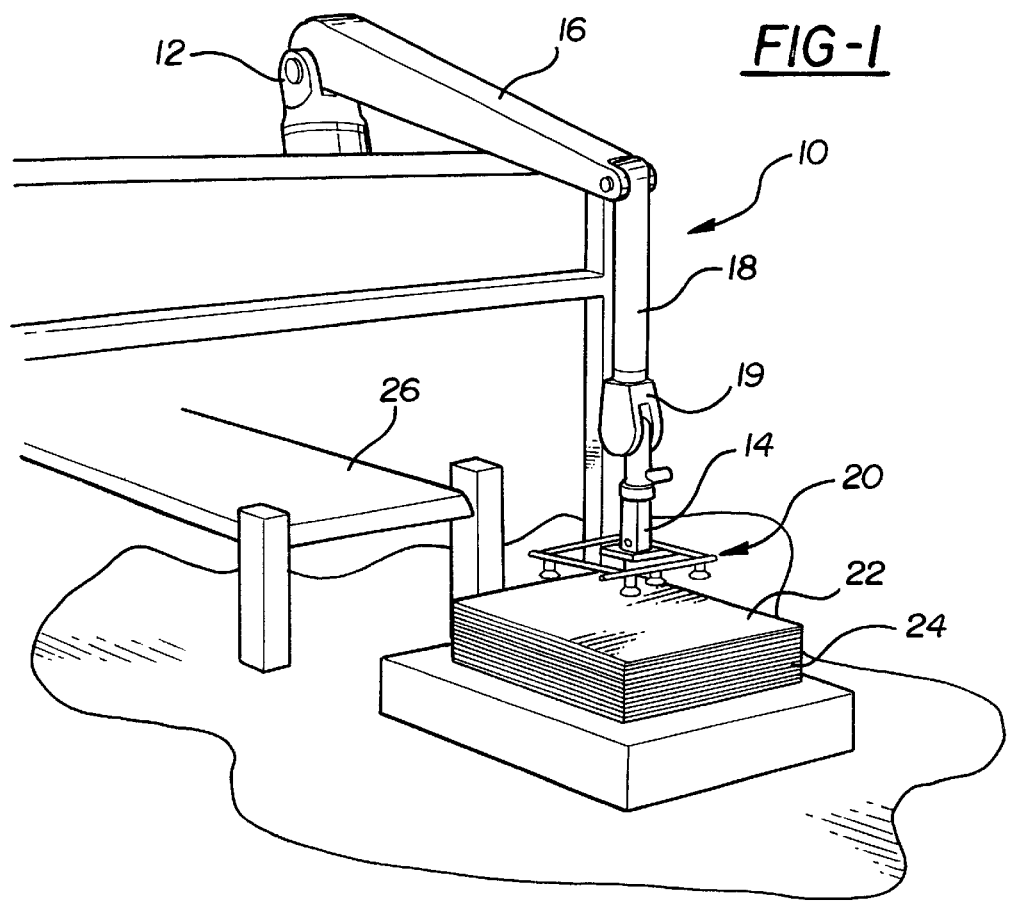
FIG. 1 is a perspective view of a robotic manipulator having a gripping tool assembly in accordance with the subject invention.

Referring to the Figures, wherein like numerals indicate like or corresponding parts throughout the several views, a robotic manipulator is generally shown at 10 in FIG. 1. The robotic manipulator 10 may be utilized in a manufacturing plant for accomplishing such tasks as material handling, machine loading and unloading, parts transfer, and manufacturing assembly. Preferably, the robot 10 has a rotatable base 12 with at least one lift arm 14. The base 12 may be stationary or may be mounted to an adjustable track (as shown). The robot 10 includes a shoulder section 16 and a forearm section 18. The lift arm 14 is pivotally connected to a wrist 19 of the forearm section 18 as is known in the art. The robotic manipulator 10 is capable of moving the lift arm 14 through a variety of different angles, heights and positions.

A gripping tool assembly, generally shown at 20, is mounted to the lift arm 14 of the robot 10 for performing a desired operation. As appreciated, the gripping tool assembly 20 is shown schematically in FIG. 1. The gripping tool assembly 20 can grasp, hold and transport a variety of objects or parts such that the robot 10 can move the parts from one point to another. Preferably, the gripping tool assembly 20 is designed to grasp and move individual sheets of material 22, such as thin sheets of aluminum or other such metal sheets. Even more preferably, the gripping tool assembly 20 and robotic manipulator 10 are designed to separate an uppermost sheet of material 22 from a stack of material 24 and then transport the sheet of material 22 to a conveyor 26 or manufacturing press (not shown). The manufacturing press stamps or otherwise deforms each sheet 22 into a desired shape. As appreciated, the gripping tool assembly 20 of the subject invention could be used in virtually any type of manufacturing application and can be sized to grip and transport virtually any sized object.

Figure 2:
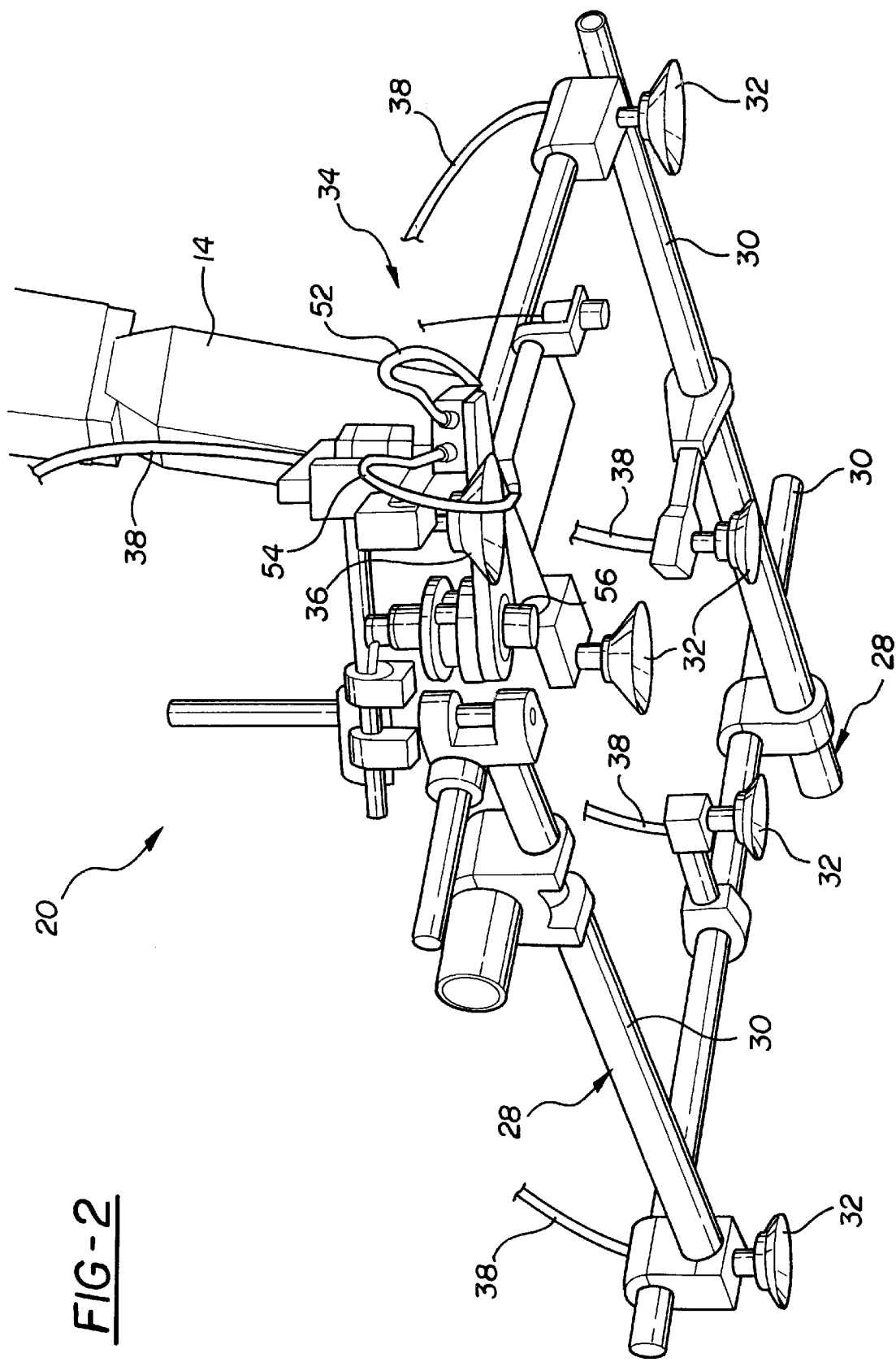
FIG. 2 is a perspective view of the gripping tool assembly.

Referring to FIG. 2, a frame 28 is fixedly mounted to the lift arm 14. The frame 28 is preferably sized to accommodate the particular sheet of material 22 being lifted. Specifically, the frame 28 has a number of interlocking tubular members 30 which are formed to span the entire sheet of material 22. The tubular members 30 can be formed of any suitable material and can be configured in any particular fashion.

At least one stationary suction lifter 32 is fixedly secured to the frame 28 for engaging and grasping the uppermost sheet of material 22. Preferably, at least one stationary suction lifter 32 includes a plurality of stationary suction lifters 32 spaced about the frame 28 for providing a substantially equidistant grasping force during the lifting of the uppermost sheet of material 22. The suction lifters 32 may be of any suitable suction cup design.

Referring also to FIGS. 3 through 6, at least one separating device, generally shown at 34, is movably mounted to the frame 28 for grasping and lifting a peripheral portion of the uppermost sheet of material 22. As appreciated, a peripheral portion is the outer section of the top sheet of material 22. The separating device 34 includes a separating suction lifter 36 for grasping and lifting the peripheral portion of the uppermost sheet of material 22. The separating suction lifter 36 of the separating device 34 is used to create an initial separation of the uppermost sheet of material 22 from the stack of material 24. The lifting of the peripheral portion bends the sheet of material 22 as is discussed in greater detail below. As appreciated, the bending of the top sheet of material 22 does not bend the sheet 22 beyond the elasticity of the metal sheet 22. In other words, the top metal sheet 22 is not permanently bent or deformed during this initial separation.

The stationary suction lifters 32 grasp and lift the remaining portions of the uppermost sheet of material 22 after the initial separation of the uppermost sheet of material 22. The operation and interrelation of the separating device 34 and stationary suction lifters 32 is discussed in greater detail hereinbelow.

A plurality of vacuum lines 38 are connected to the stationary suction lifters 32 and the separating suction lifter 36 for providing a vacuum between the suction lifters 32, 36 and the uppermost sheet of material 22 to securely fasten the suction lifters 32, 36 to the uppermost sheet of material 22. Accordingly, each stationary 32 and separating 36 suction lifter can be firmly secured to a portion of the top sheet 22. When it is desirable to release the top sheet 22, the vacuum is stopped and the suction lifters 32, 36 automatically detach from the top sheet of material 22. To assist in the detachment of the suction lifters 32, 36, a anti-vacuum or positive pressure may be applied between the suction lifters 32, 36 and the sheet of material 22.

As discussed above, the gripping tool assembly 20 and robotic manipulator 10 of the subject invention preferably grasp, hold and transport sheets of metal 22 from a stack of metal material 24 to the conveyor 26. As also discussed above, a significant problem associated with this operation is ensuring that the gripping tool assembly 20 transports only one sheet of material 22 at a time. The gripping tool assembly 20 of the subject invention therefore includes the separating device 34 mounted to one outside end of the gripping tool assembly 20. Preferably, the separating device 34 is mounted to a corner of the gripping tool assembly 20 for grasping a corner of the top sheet of material 22.

The separating device 34 includes a mounting plate 40 mounted to the frame 28 with a beam 42 extending from the top thereof. A lever arm 44, having first 46 and second 48 ends, is pivotally connected to the mounting plate 40. The lever arm 44 interconnects the separating suction lifter 36 to the frame 28 for moving the separating suction lifter 36 between a first position substantially level with the stationary suction lifters 32 and a second position raised above the stationary suction lifters 32. An actuation device 50 interconnects the first end 46 of the lever arm 44 to the beam 42. Preferably, the actuation device 50 is a pneumatic cylinder 50 for facilitating the movement of the lever arm 44.

The second end 48 of the lever arm 44 is angled slightly upward in relation to the first end 46 and extends outwardly from the mounting plate 40 for attachment to the separating suction lifter 36. Preferably the lever arm 44 has a boomerang like configuration with the first end 46 longer than the second end 48. Downward movement of the first end 46 moves the second end 48 and the separating suction lifter 36 upward and upward movement of the first end 46 moves the second end 48 and the separating suction lifter 36 downward. As appreciated, the lever arm 44 may be of any suitable design and the actuation device 50 may be any suitable device so long as the separating suction lifter 36 can be moved upwardly and downwardly in relation to the frame 28. In addition, the separating suction lifter 36 may be of any suitable size and there may even be multiple separating suction lifters 36 mounted to different portions of the frame 28. In other words, the subject invention contemplates the use of multiple gripping tool assemblies 20.

As discussed above, the separating suction lifter 36 is preferably mounted to the corner of the frame 28 such that the separating suction lifter 36 engages an outward corner of the uppermost sheet of material 22. As the separating suction lifter 36 is moved upward and downward the corresponding corner of material 22 is also lifted upward and downward. This upward and downward movement assists in separating the attached top sheet of material 22 from the stack of material 24 as will be discussed below.

The gripping tool assembly 20 is characterized by first 52 and second 54 air hoses mounted to the frame 28 with the first air hose 52 positioned above the second air hose 54 whereby the first air hose 52 provides pressurized air toward the periphery of the uppermost sheet of material 22 to assist in the initial separation of the uppermost sheet of material 22 and the second air hose 54 provides pressurized air below the uppermost sheet of material 22 after the initial separation of the uppermost sheet of material 22. The first 52 and second 54 air hoses are preferably air nozzles 52, 54 which accurately direct the pressurized air toward the desired location.

Preferably, the first air nozzle 52 extends outwardly from the frame 28, curls inward toward the frame 28 and is substantially aligned with the separating device 34. Hence, the first air nozzle 52 faces the edge of the top sheet of material 22. The second air nozzle 54 preferably extends outwardly from the frame 28, curls inward toward the frame 28 and is disposed below the separating device 34 for dispensing pressurized air between the uppermost sheet of material 22 and the stack of material 24. The pressurized air passing through the first 52 and second 54 air nozzles is specifically controlled by a control panel (not numbered) to operate only when necessary, thereby increasing the efficiency of the gripping tool assembly 20. As appreciated, there may be any number of air hoses or nozzles as deemed necessary. Further, if additional gripping tool assemblies 20 are to be utilized, then corresponding air hoses will accompany each tool assembly 20.

As appreciated by those skilled in the art and as discussed in the background section, a strong suction or vacuum force is experienced between the top sheet of material 22 and the stack of material 24. As the top sheet 22 is pulled away from the stack 24, the suction or vacuum force increases. The pressurized air extending from the first 52 and second 54 air nozzles is designed to counteract this suction and reduce the vacuum created between the top sheet 22 and the stack 24. The subject invention utilizes the first 52 and second 54 air nozzles to localize the air pressure and increase the efficiency of the gripping tool assembly 20.

The gripping tool assembly 20 further includes a sensor 56 mounted to the frame 28 and disposed adjacent the separating device 34 for detecting if one or more sheets of material 22 are being lifted during the initial separation of the uppermost sheet of material 22. Preferably, the sensor 56 is a double blank analyzer 56 extending from the frame 28 and abutting the top sheet of material 22 being lifted. The blank analyzer 56 scans the top sheet 22 being lifted as is known in the art. The blank analyzer 56 determines if one or more sheets of material 22 has been lifted by the separating suction lifter 36. The blank analyzer 56 is connected to the control panel to assist in determining when the pressurized air should be applied to help separate the sheets 22. As appreciated, any suitable sensor 56 may be utilized.

Figure 3:
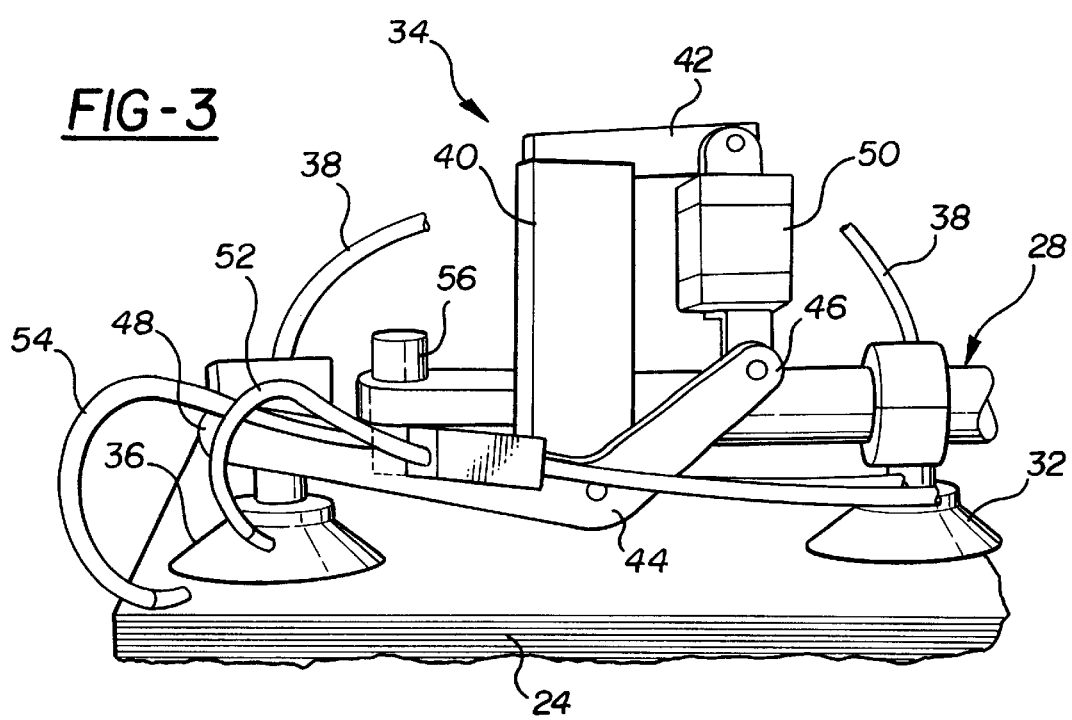
FIG. 3 is a perspective view of a separating device of the gripping tool assembly shown in spaced relationship to a stack of material.
Figure 4:
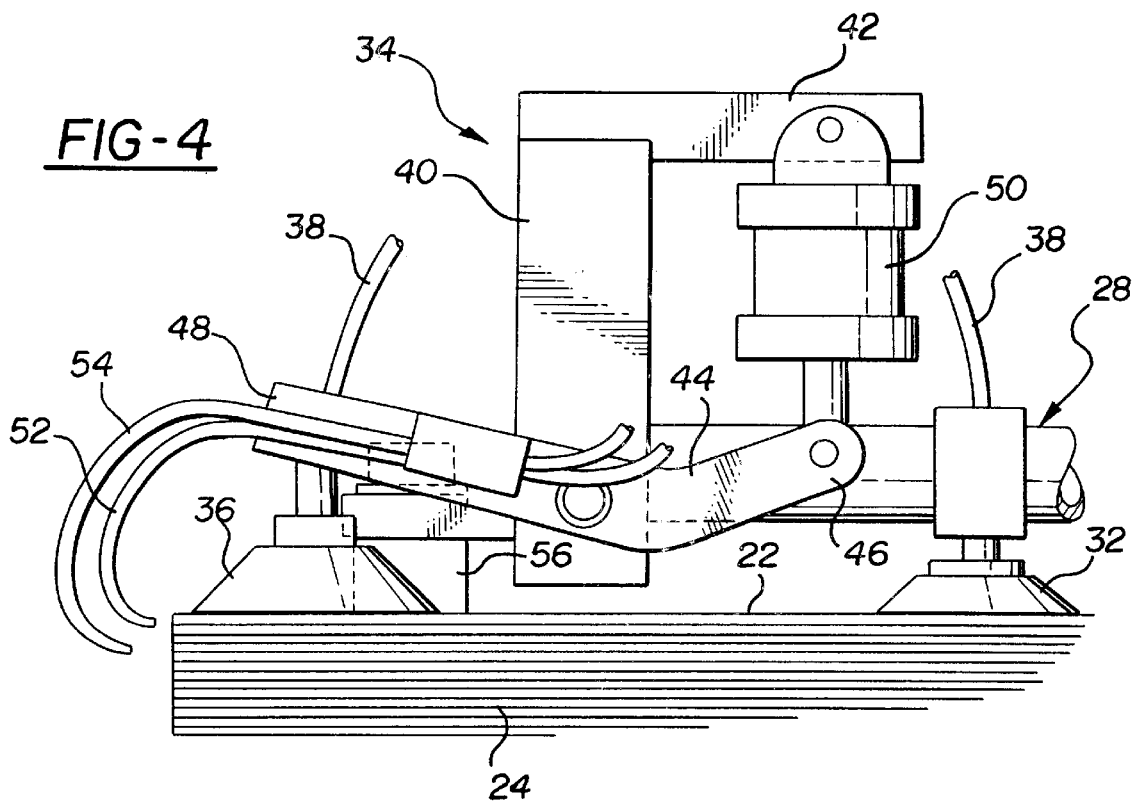
FIG. 4 is a side view of the separating device grasping a top sheet of material.

The method of operation for the robotic manipulator 10 and gripping tool assembly 20 will now be discussed in greater detail. The method comprises the steps of; affixing the stationary suction lifters 32 to the uppermost sheet of material 22 and similarly affixing the separating device 34 to the uppermost sheet of material 22. In particular, the gripping tool assembly 20 is lowered over a stack of material 24, as shown in FIGS. 1 and 3, wherein the stationary suction lifters 32 and separating suction lifter 36 engage the top sheet 22, as shown in FIG. 4. The sensor 56 also engages the top sheet 22.

The affixing of the stationary suction lifters 32 is further defined as applying the vacuum between the stationary suction lifters 32 and the uppermost sheet of material 22 to securely fasten the stationary suction lifters 32 to the uppermost sheet of material 22. Similarly, the affixing of the separating device 34 is further defined as applying the vacuum between the separating device 34 and the uppermost sheet of material 22 to securely fasten the separating device 34 to the uppermost sheet of material 22. As appreciated, the vacuum will preferably be applied to both of the stationary suction lifters 32 and the separating device 34 before the separating device 34 is actuated.

Figure 5:
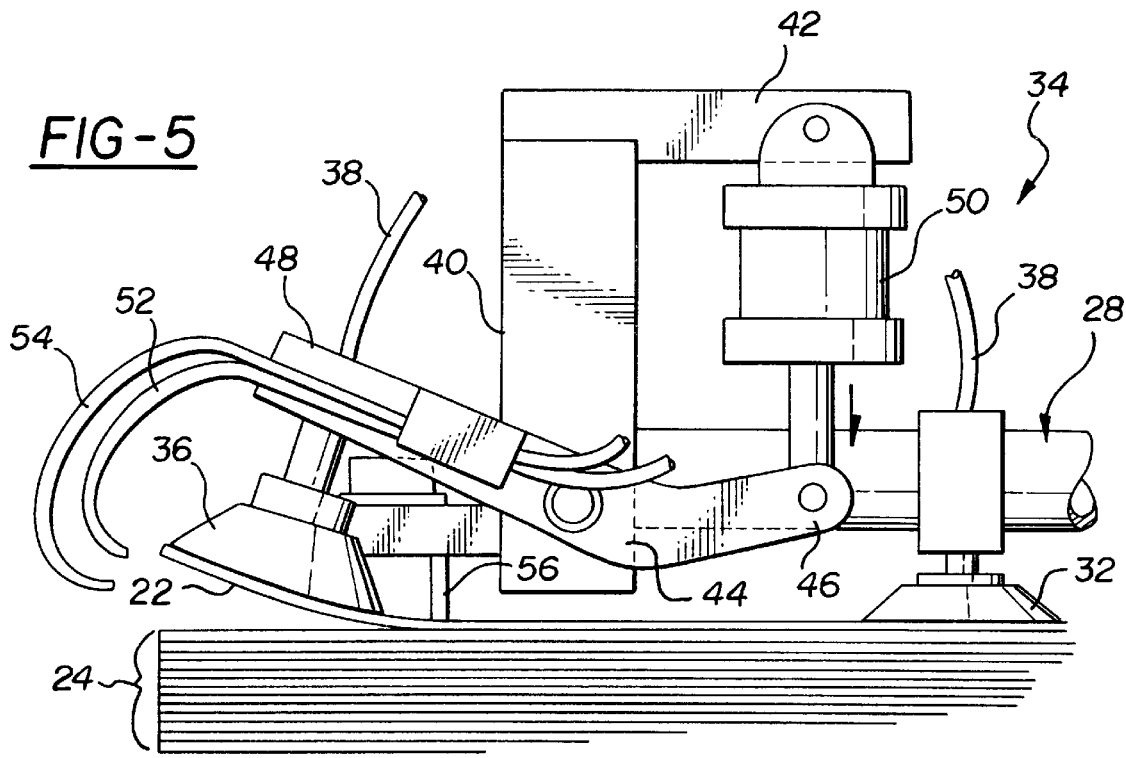
FIG. 5 is a side view of the separating device creating an initial separation of the top sheet from the stack of material.

As shown in FIG. 5, the separating device 34 is then actuated to lift the peripheral portion of the uppermost sheet of material 22 to create the initial separation between the uppermost sheet and the stack of material 24. The actuating of the separating device 34 is further defined as moving the separating device 34 between the first position substantially level with the stationary suction lifters 32 and the second position raised above the stationary suction lifters 32 until the peripheral portion of the uppermost sheet of material 22 has detached from the stack of material 24. In particular, the pneumatic cylinder 50 pushes the first end 46 downward which pivots the lever arm 44 and raises the second end 48. This in turn raises the separating suction lifter 36 and the attached corner of material 22.

As shown in FIG. 4, the method is characterized by dispensing pressurized air toward the periphery of the uppermost sheet of material 22 simultaneously with the actuating of the separating device 34. As shown in FIG. 6, the method is also characterized by dispensing pressurized air below the uppermost sheet of material 22 after the initial separation of the uppermost sheet of material 22. In other words, pressurized air simultaneously passes through the first air nozzle 52 to assist in separating the sheet 22 being lifted from the stack of sheets 24 below (FIG. 4). In addition, pressurized air passes below the top sheet 22 once the corner of the top sheet 22 has been lifted (FIG. 6). As discussed above, the pressurized air reduces the vacuum effect between the top sheet 22 and the stack of material 24.

The thickness of the sheets of material 22 being lifted are detected during the initial separation of the uppermost sheet of material 22 to ensure that only the uppermost sheet of material 22 is being separated from the stack of material 24. Specifically, the blank analyzer 56 determines if the corner of one or more sheets of material 22 has been lifted. If only one sheet 22 is lifted, the pressurized air passing through the first air nozzle 52 is stopped as shown in FIG. 5.

If it is determined that more than one sheet 22 is being lifted, then the pneumatic cylinder 50 lifts upward which lifts the first end 46 upward and pushes the second end 48 downward. This pushes the separating suction lifter 36 downward and returns the sheet of material 22 to the original flat position overlaying the stack 24 (FIG. 4). The corner lifting cycle discussed above of the separating device 34 is repeated until the corner of the top sheet 22 being lifted separates from the stack 24. In other words, the separating device 34 may be recycled between the first and second positions, as illustrated in FIGS. 4 and 5, until only the uppermost sheet of material 22 is separated from the stack of material 24. During this recycling the air pressure passing through the first air nozzle 52 may remain continuous or may cycle on and off as desired by the end user.

Once the corner of the sheet of material 22 has separated, the pressurized air now passes through the second air nozzle 54 to assist in separating the remaining portions of the top sheet 22 being lifted from the stack of sheets 24 (FIG. 6). As the pressurized air passes through the second air nozzle 54, the gripping tool assembly 20 slowly lifts and completely separates the uppermost sheet of material 22 from the stack of material 24.

Once the sheet of material 22 has detached form the stack 24, the pressurized air passing through the second air nozzle 54 is stopped. The uppermost sheet of material 22 may now be transported to a position away from the stack of material 24. In other words, the robotic manipulator 10 and gripping tool assembly 20 can now transport the single sheet of material 22 to any desired location. The separated top sheet of material 22 is placed at the desired location and the vacuum created within the stationary suction lifter 32 and separating suction lifter 36 is extinguished. The gripping tool assembly 20 then releases from the transported sheet of material 22. The robotic manipulator 10 and gripping tool assembly 20 can now return to the stack of sheets 24 and repeat the above described operation.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A robotic manipulator having a gripping tool assembly for separating an uppermost sheet of material from a stack of material, said assembly comprising;

a lift arm, a frame fixedly mounted to said lift arm, at least one separating device movably mounted to said frame for grasping and lifting a peripheral portion of the uppermost sheet of material to create an initial separation of the uppermost sheet of material from the stack of material, and at least one stationary suction lifter fixedly secured to said frame for grasping and lifting the remaining portions of the uppermost sheet of material after said initial separation of the uppermost sheet of material, said assembly characterized by first and second air hoses mounted to said frame with said first air hose positioned above said second air hose whereby said first air hose provides pressurized air toward the periphery of the uppermost sheet of material to assist in said initial separation of the uppermost sheet of material and said second air hose provides pressurized air below the uppermost sheet of material after said initial separation of the uppermost sheet of material.

2. An assembly as set forth in claim 1 wherein said first air hose extends outwardly from said frame, curls inward toward said frame and is substantially aligned with said separating device.

3. An assembly as set forth in claim 2 wherein said second air hose extends outwardly from said frame, curls inward toward said frame and is disposed below said separating device for dispensing pressurized air between the uppermost sheet of material and the stack of material.

4. An assembly as set forth in claim 3 further including a sensor mounted to said frame and disposed adjacent said separating device for detecting if one or more sheets of material are being lifted during said initial separation of the uppermost sheet of material.

5. An assembly as set forth in claim 3 wherein said separating device includes a separating suction lifter for grasping and lifting the peripheral portion of the uppermost sheet of material.

6. An assembly as set forth in claim 5 wherein said separating device further includes a lever arm interconnecting said separating suction lifter to said frame for moving said separating suction lifter between a first position substantially level with said at least one stationary suction lifters and a second position raised above said at least one stationary suction lifters.

7. An assembly as set forth in claim 6 wherein said separating device further includes a pneumatic cylinder for facilitating said movement of said lever arm.

8. An assembly as set forth in claim 5 wherein said at least one stationary suction lifter includes a plurality of stationary suction lifters spaced about said frame for providing a substantially equidistant grasping force during said lifting of the uppermost sheet of material.

9. An assembly as set forth in claim 8 further including a plurality of vacuum lines connected to said stationary suction lifters and said separating suction lifter for providing a vacuum between said suction lifters and the uppermost sheet of material to securely fasten said suction lifters to the uppermost sheet of material.

10. A method of separating an uppermost sheet of material from a stack of material utilizing a movable separating device and a plurality of stationary suction lifters, said method comprising the steps of;

affixing the stationary suction lifters to the uppermost sheet of material, affixing the separating device to the uppermost sheet of material, and actuating the separating device to lift a peripheral portion of the uppermost sheet of material to create an initial separation between the uppermost sheet and the stack of material, said method characterized by dispensing pressurized air toward the periphery of the uppermost sheet of material simultaneously with the actuating of the separating device and dispensing pressurized air below the uppermost sheet of material after the initial separation of the uppermost sheet of material.

11. A method as set forth in claim 10 wherein the actuating of the separating device is further defined as moving the separating device between a first position substantially level with the stationary suction lifters and a second position raised above the stationary suction lifters until the peripheral portion of the uppermost sheet of material has detached from the stack of material.

12. A method as set forth in claim 11 wherein the affixing of the stationary suction lifters is further defined as applying a vacuum between the stationary suction lifters and the uppermost sheet of material to securely fasten the stationary suction lifters to the uppermost sheet of material.

13. A method as set forth in claim 12 wherein the affixing of the separating device is further defined as applying a vacuum between the separating device and the uppermost sheet of material to securely fasten the separating device to the uppermost sheet of material.

14. A method as set forth in claim 13 further including detecting the number of sheets of material being lifted during the initial separation of the uppermost sheet of material to ensure that only the uppermost sheet of material is being separated from the stack of material.

15. A method as set forth in claim 14 further including recycling the separating device between the first and second positions until only the uppermost sheet of material is separated from the stack of material.

16. A method as set forth in claim 15 further including lifting and completely separating the uppermost sheet of material from the stack of material.

17. A method as set forth in claim 16 further including transporting the uppermost sheet of material to a position away from the stack of material.

* * * * *